US011426961B2

(12) United States Patent
Kaagman et al.

(10) Patent No.: US 11,426,961 B2
(45) Date of Patent: Aug. 30, 2022

(54) PRESSURE ROLL AND METHOD FOR PRESSING A TIRE LAYER ON A TIRE BUILDING DRUM

(71) Applicant: VMI HOLLAND B.V., Epe (NL)

(72) Inventors: Mattheus Jacobus Kaagman, Epe (NL); Hemmeterius Bernardus Broek, Epe (NL)

(73) Assignee: VMI HOLLAND B.V.

(*) Notice: Subject to any disclaimer, the term of this patent is extended or adjusted under 35 U.S.C. 154(b) by 0 days.

(21) Appl. No.: 17/040,494

(22) PCT Filed: Mar. 15, 2019

(86) PCT No.: PCT/NL2019/050164
§ 371 (c)(1),
(2) Date: Sep. 22, 2020

(87) PCT Pub. No.: WO2019/182439
PCT Pub. Date: Sep. 26, 2019

(65) Prior Publication Data
US 2021/0023805 A1 Jan. 28, 2021

(30) Foreign Application Priority Data

Mar. 22, 2018 (NL) .................................. 2020644

(51) Int. Cl.
*B29D 30/28* (2006.01)
*B29D 30/26* (2006.01)
(Continued)

(52) U.S. Cl.
CPC .............. *B29D 30/26* (2013.01); *B29D 30/28* (2013.01); *B29D 30/245* (2013.01); *B29D 2030/202* (2013.01); *B29D 2030/3257* (2013.01)

(58) Field of Classification Search
CPC ........ B29D 30/14; B29D 30/28; B29C 70/388
See application file for complete search history.

(56) References Cited

U.S. PATENT DOCUMENTS 1,970,780 A * 8/1934 Stevens .................. B29D 30/28
156/398
4,750,965 A * 6/1988 Pippel ................... B29C 70/388
156/361
(Continued)

FOREIGN PATENT DOCUMENTS

CN      203141856      8/2013   ............. B29D 30/20
EP      3 130 455      2/2017   ............. B29D 30/26
(Continued)

OTHER PUBLICATIONS

"Know Your Pneumatics: Single or Double Acting? Chhosing the Right Cylinder," blog.parker.com/know-your-pneumatics-single-or-double-acting-choosing-the-right-cylinder, Sep. 26, 2017 (retrieved May 12, 2021).*

(Continued)

*Primary Examiner* — Geoffrey L Knable
(74) *Attorney, Agent, or Firm* — Hayes Soloway P.C.

(57) ABSTRACT

Disclosed is a pressure roll and a method for pressing a tire layer on a tire building drum in a pressing direction, wherein the pressure roll includes a shaft and a plurality of discs, wherein each disc has an interior part and an exterior part, wherein each interior part is provided with a recess for receiving the shaft, wherein the recess is larger than the shaft in the pressing direction for allowing movement of the disc with respect to said shaft in the pressing direction, wherein the pressure roll includes for each disc one or more actuators for individually moving the disc, wherein one actuator is arranged for moving the respective disc with respect to the shaft in the pressing direction and the same or another (Continued)

actuator is arranged for moving the respective disc with respect to the shaft in a retraction direction opposite to the pressing direction.

32 Claims, 7 Drawing Sheets

(51) Int. Cl.
  *B29D 30/24* (2006.01)
  *B29D 30/20* (2006.01)
  *B29D 30/32* (2006.01)

(56) References Cited

U.S. PATENT DOCUMENTS

| | | | | |
|---|---|---|---|---|
| 5,011,563 | A * | 4/1991 | Shinno | B29C 70/388 156/353 |
| 6,105,648 | A | 8/2000 | De Graaf et al. | 156/421 |
| 8,042,594 | B2 | 10/2011 | Miller et al. | 156/582 |
| 10,414,110 | B2 | 9/2019 | Iyanagi | B29D 30/14 |
| 10,792,878 | B2 | 10/2020 | Arends et al. | B29D 30/28 |
| 2008/0000576 | A1 | 1/2008 | Miller et al. | 156/166 |
| 2017/0087785 | A1 * | 3/2017 | Iyanagi | B29D 30/16 |
| 2018/0141295 | A1 | 5/2018 | Arends et al. | B29D 30/28 |

FOREIGN PATENT DOCUMENTS

| | | | |
|---|---|---|---|
| JP | 2001-501548 | 2/2001 | B29D 30/28 |
| JP | 2009-542477 | 12/2009 | B29C 70/06 |
| JP | 2015-202589 | 11/2015 | B29D 30/26 |
| JP | 2018-516783 | 6/2018 | B29D 30/30 |
| WO | WO 2016/184446 | 11/2016 | B29D 30/28 |

OTHER PUBLICATIONS

International Search Report and Written Opinion issued in PCT/NL2019/050164, dated Jul. 22, 2019, 8 pages.

International Preliminary Report on Patentability issued in PCT/NL2019/050164, dated Sep. 22, 2020, 6 pages.

Japanese Decision to Grant Patent issued in corresponding Japanese Patent Application Serial No. 2019-554740, dated Nov. 20, 2020 with English translation (5 pages).

* cited by examiner

PRESSURE ROLL AND METHOD FOR PRESSING A TIRE LAYER ON A TIRE BUILDING DRUM

BACKGROUND

The invention relates to a pressure roll and a method for pressing a tire layer on a tire building drum.

CN 203141856 U discloses a tire building apparatus with a pressure roll, wherein the pressure roll is provided with a non-rotatable shaft and a plurality of uniformly shaped radial discs which are arranged on said shaft. Each disc comprises an interior part and an exterior part, wherein the interior part is provided with a recess which accommodates the shaft. In one direction, the recess has a length which is greater than the corresponding size of the shaft in said one direction, wherein the length of the recess in said one direction allows for translation of the disc with respect to the shaft and the other discs in said one direction. Each disc is individually moved by pistons. The piston rods of said pistons are extended to come into abutment with the bottom walls of the recesses or with slots in said bottom walls. The abutment pushes the respective discs downwards with respect the shaft to apply pressure onto the tyre layers on the drum.

The pressure roll is mounted in a moveable fixture that is moveable with respect to the drum between a lifted position in which the pressure roll does not abut the tire layers and an abutment position in which the pressure roll abuts the tire layers applied to the drum.

WO 2016/184,446 A1 discloses a pressing device with a plurality of discs arranged on a shaft and a plurality of pneumatically driven actuators which extend from the top of the shaft to come into abutment with the top wall of the recess. Hence, in contrast to the pressure roll as disclosed in CN 203141856 U, the pressing device of WO 2016/184,446 A1 is arranged to lift the discs upwards, while the discs may return to the lowered position under their own weight when the actuators are retracted.

SUMMARY OF THE INVENTION

A disadvantage of the known pressure roll and the known pressure device is that the pressure force exerted by the discs onto the tire layer on the tire building drum can only be actively controlled in one direction. In some cases however, there is a need to actively and individually control the pressure force exerted by the discs onto the tire layer in both directions, i.e. to individually retract one or more discs to an extent that they no longer contact the tire layer on the tire building drum or to actively push one or more discs more forcefully against the tire layer on the tire building drum. In the known pressure roll and pressure device, the actuators are not coupled to the interior parts of the discs and can therefore only displace the discs through abutment. In other words, the actuators can not actively pull the discs in the opposite direction. Hence, the discs can only be controlled to move in one direction, while in the opposite direction, the movement of the discs is dependent on position of the movable fixture, and thus the pressure roll, as a whole, relative to the tire layer and/or the tire building drum. In particular, in the pressure roll of CN 203141856 U, the discs will only return when pressed back by an external force, i.e. as a result of pressing contact of the pressure roll on the tire layer. In WO 2016/184,446 A1, the discs will only return under their own weight when the pressure device no longer contacts the tire layer and/or the tire building drum.

It is an object of the present invention to provide a pressure roll and a method for pressing a tire layer on a tire building drum, wherein the control of the pressure applied by the discs on the tire layer on the tire building drum can be improved.

According to a first aspect, the invention provides a pressure roll for pressing a tire layer on a tire building drum in a pressing direction, wherein the pressure roll comprises a shaft that defines a roll axis extending in an axial direction and a plurality of discs juxtaposed in the axial direction on said shaft, wherein each disc comprises an interior part that is non-rotatably supported on the shaft and an exterior part that is rotatable with respect to the interior part about the roll axis, wherein each interior part is provided with a recess for receiving the shaft in the axial direction through the respective disc, wherein the recess is larger than the shaft in the pressing direction for allowing movement of the respective disc with respect to said shaft in the pressing direction, wherein the pressure roll comprises for each disc one or more actuators for individually moving the respective disc with respect to the other discs, wherein one of the one or more actuators is arranged for moving the respective disc with respect to the shaft in the pressing direction and wherein the same or another one of the one or more actuators is arranged for moving the respective disc with respect to the shaft in a retraction direction opposite to the pressing direction, wherein at least one of the one or more actuators is provided with a coupling element for coupling said at least one actuator to the interior part of the respective disc in the pressing direction.

By providing the pressure roll with the ability to not only control the position of the discs in the pressing direction, but also in the retraction direction, the pressure applied by the discs on the tire layer on the tire layer drum can be controlled more accurately. In particular, the pressure may be reduced for some discs while for other discs, it may be increased. In another application, one or more discs may even be lifted in the retraction direction into a position spaced apart from the tire layer and/or the tire building drum. The coupling can allow the actuator to exert both a pushing force and pulling force onto the disc. Hence, the pressing force exerted by the discs on the tire layer on the tire building drum can be controlled individually in both directions.

In a first exemplary embodiment the one or more actuators comprise a bi-directional actuator for alternately moving the respective disc with respect to the shaft in the pressing direction and the retraction direction. Hence, the same actuator can be used for moving the respective disc in both directions.

Preferably, the bi-directional actuator is an air cylinder that is connectable to a valve unit for alternately connecting to a compressed air source and a vacuum source. The resulting air cylinder can act in both directions depending on the source.

More preferably, the shaft comprises an air channel for connecting the respective bi-directional actuator to a valve unit for alternately connecting to a compressed air source and a vacuum source. Hence, a single air channel can be used to connect the bi-directional actuator alternately to a compressed air source and a vacuum source. This is particularly advantageous since the shaft dimensions often restrict the number of air channels that can be integrated therein. The valve unit can conveniently be located outside of or external to the shaft.

In a second exemplary embodiment the one or more actuators comprise a first actuator for moving the respective disc with respect to the shaft in the pressing direction and a second actuator for moving the respective disc with respect to the shaft in the retraction direction. Hence, the movements in the two directions can be controlled by separate actuators. This can for example be useful when a single actuator is unable to provide the forces required for pressing or retraction.

In one particular embodiment thereof the first actuator and the second actuator are located in the recess of the respective disc on the same side of the shaft in the pressing direction or the retraction direction, wherein the first actuator is arranged for pushing the respective disc away from the shaft and wherein the second actuator is arranged for pulling the respective disc towards the shaft. By having both actuators on the same side of the shaft, the shaft size can be maximized in the opposite direction.

In said embodiment, it is preferred that the first actuator is an air cylinder connectable to a compressed air source and wherein the second actuator is an air cylinder connectable to a vacuum source. By connecting the actuators to different sources, the actuators can move the respective disc in opposite directions despite being located on the same side of the shaft.

In said embodiment, it is further preferred that the shaft comprises a compressed air channel for connecting the first actuator to a compressed air source and a vacuum air channel for connecting the second actuator to a vacuum source. Thus, by providing separate air channels connected to the individual actuators, there is no need to provide complex valves to regulate the flow of compressed air or vacuum.

In an alternative third embodiment, also including a first and second actuator, the first actuator and the second actuator are located in the recess of the respective disc on opposite sides of the shaft in the pressing direction and the retraction direction, respectively, wherein the first actuator and the second actuator are both arranged for pushing the respective disc away from the shaft or pulling the respective disc towards the shaft. Hence, both actuators can operate in the same way. By alternating their operation, the respective disc can be moved alternately in the pressing direction and the retraction direction.

In said alternative embodiment, it is preferred that the first actuator and the second actuator are air cylinders which are connectable to a compressed air source or a vacuum source. Hence, both air cylinders can be connected to a compressed air source or a vacuum source. A valve can be used to alternate the flow of compressed air or the vacuum between the first actuator and the second actuator.

In said alternative embodiment, it is further preferred that the shaft comprises a first air channel for connecting the first actuator to a compressed air source or a vacuum source and a second air channel for connecting the second actuator to the same air source or vacuum source. By having separate air channels connected to the same source, any valves can be conveniently provided outside of or external to the shaft.

In a fourth exemplary embodiment, the one or more actuators comprise an auto return actuator that is provided with a drive element that is arranged for driving the movement of the respective disc in one of the pressing direction and the retraction direction and a biasing element that is arranged to bias the drive element to return in the other of the pressing direction and the retraction direction. The auto-return actuator can therefore actively drive the respective disc in one of the directions, while passively returning in the other direction when the driving force is absent. The auto-return actuator can thus be relatively simple in construction.

In a fifth alternative embodiment, the one or more actuators comprises a bi-directional actuator that is a mechanical, electric or electro-mechanical bi-directional actuator. The movement of the respective discs may for example be controlled by a plurality of electrically driven, linear drives, as an alternative to the previously discussed air cylinders.

In a further, more general embodiment, at least one of the one or more actuators is arranged to engage with or connect to the interior part of the respective disc, wherein the engagement or connection prevents that the at least one actuator is moved out of engagement with or connection to interior part of the respective disc in the axial direction. In the prior art pressure roll, the piston rods only abut the discs from inside the recess. The discs may therefore slide in the axial direction with respect to the piston rods. Considering that the number of discs in a pressure roll can be quite high, e.g. more than one-hundred, the overall tolerance build-up in the axial direction may exceeds the width of an individual disc, causing said disc, in particular when it is located at the center of the pressure roll in the axial direction, to slide out of alignment with the corresponding piston rod. This may cause unexpected behavior or even malfunctioning of the conventional pressure roll. In the pressure roll according to the invention, the sliding in the axial direction can be prevented, e.g. by restricting the movement in the axial direction or by fixing the actuator to the respective disc, to ensure that each disc remains aligned with the respective actuator.

In another embodiment the coupling element is arranged for detachably coupling said at least one actuator to the interior part of the respective disc in the pressing direction. The detachable coupling can further be convenient when assembling and/or disassembling the pressure roll.

Preferably, the interior part of the respective disc is provided with a mounting element for mounting the coupling element. More preferably, the mounting element is a slot, wherein the coupling element is arranged to engage the slot. By providing a mounting element on the respective disc, the position to which the actuator is to be mounted during assembly is immediately clear. By providing the mounting element as a slot, the coupling element can be simply inserted.

In one particular embodiment the mounting elements of directly adjacent discs are offset with respect to each other in an offset direction perpendicular to the pressing direction and the axial direction. By offsetting the mounting elements, the actuators can be arranged in the same offset positions, thereby allowing the actuators to be placed more closely together in the axial direction. The offset can further ensure that the previously mentioned slots are closed or blocked in the axial direction by the interior parts of the directly adjacent discs, thus preventing the coupling element in said slot from sliding out of the slot in the axial direction.

In a further embodiment thereof each disc has a bisector line extending parallel to the pressing direction, wherein the mounting elements of the directly adjacent discs are located on opposite sides of and at the same distance from the bisector line. The mounting elements can thus be arranged mirror symmetrically.

The aforementioned embodiment becomes even more advantageous when the directly adjacent discs are identical, because then one of the discs of the directly adjacent discs can be flipped about the bisector line with respect to the other of the directly adjacent discs. The discs can thus be identical. During assembly of the pressure roll, the discs are simply flipped to obtain the offset mounting position.

In another preferred embodiment the pressure roll comprises two or more zones, wherein each zone comprises two or more discs of the plurality of discs, wherein the actuators for moving the discs within one of the zones are arranged to move all the discs within said one zone simultaneously in the pressing direction or the retraction direction. In this way, the complexity of the control of the discs can be reduced, in particular when a high number of discs is used.

According to a second aspect, the invention provides a method for pressing a tire layer on a tire building drum with the use of the pressure roll according to any one of the aforementioned embodiments, wherein the method comprises the step of:
  using one of the one or more actuators for moving the respective disc with respect to the shaft in the pressing direction; and
  using the same or another one of the one or more actuators for moving the respective disc with respect to the shaft in the retraction direction.

The method relates to the practical implementation of the pressure roll according to the first aspect of the invention. The method and its embodiments thus have the same technical advantages as the pressure roll and its respective embodiments. These advantages will therefore not be repeated hereafter.

In a first exemplary embodiment the one or more actuators comprise a bi-directional actuator that alternately moves the respective disc with respect to the shaft in the pressing direction and the retraction direction.

In a second and third exemplary embodiment the one or more actuators comprise a first actuator and a second actuator, wherein the first actuator moves the respective disc with respect to the shaft in the pressing direction and wherein the second actuator moves the respective disc with respect to the shaft in the retraction direction.

In a fourth exemplary embodiment the one or more actuators comprise an auto return actuator that comprises a drive element and a biasing element, wherein the method comprises the step of driving the drive element to move the respective disc in one of the pressing direction and the retraction direction and allowing the biasing element to return the disc in the other of the pressing direction and the retraction direction when the drive element is no longer driven.

In another, more general embodiment the pressure roll comprises two or more zones, wherein each zone comprises two or more discs of the plurality of discs, wherein the actuators for moving the discs within one of the zones move all the discs within said one zone simultaneously in the pressing direction or the retraction direction.

This can for example be used advantageously when the width of the tire building drum is variable or the tire building drum is replaceable by an alternative tire building drum with a different width, in which case the method comprises the step of moving the discs in one or more zones that are outside or at least partially outside the width of the tire building drum in the retraction direction away from the tire building drum while moving the discs in one or more zones that are within the width of the tire building drum in the pressing direction towards the tire building drum. Consequently, unnecessary contact, collision and/or wear between the retracted discs and the tire layer and/or the tire building drum can be prevented.

Additionally or alternatively, the two or more zones may comprise a center zone and side zones on either side of the center zone in the axial direction, wherein the method comprises the step of moving the discs in the side zones in the retraction direction while moving the discs in the center zone in the pressing direction. This can be useful when the tire layer is smaller than the width of the tire building drum, or when a centering force is to be applied to only the center portion of a tire layer.

In a further embodiment the method comprises the step of simultaneously moving all discs of the plurality of discs in the retraction direction. Preferably, the shaft remains stationary during said simultaneous movement. Hence, an external holder for lifting the pressure roll away from the tire building drum, as in the conventional pressure roll, is no longer required.

The previous embodiment can also be advantageous if all discs of the plurality of discs are simultaneously moved in the retraction direction when a leading end, a trailing end, a splice or another known or detected irregularity in the tire layer passes underneath said plurality of discs.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
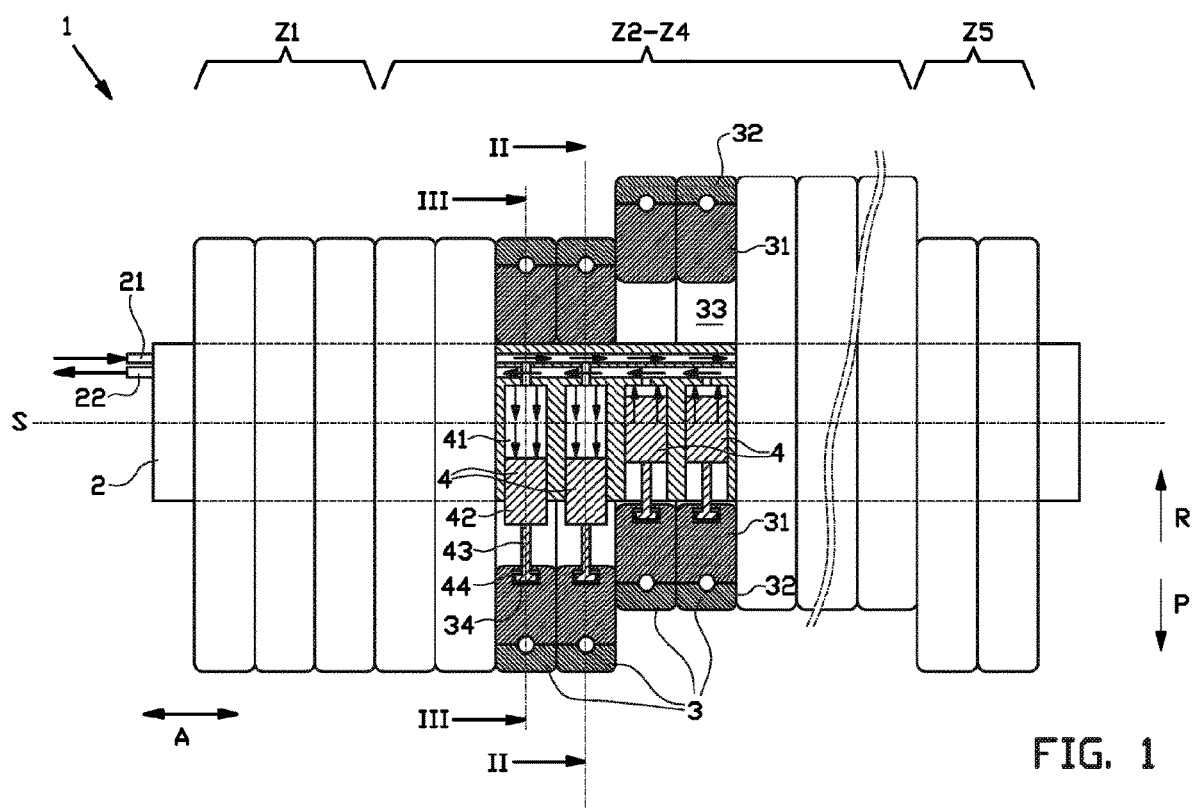
FIG. 1 shows a front view of a pressure roll with a plurality of discs according to a first exemplary embodiment of the invention, wherein a plurality of discs are shown in cross section.
Figure 2:
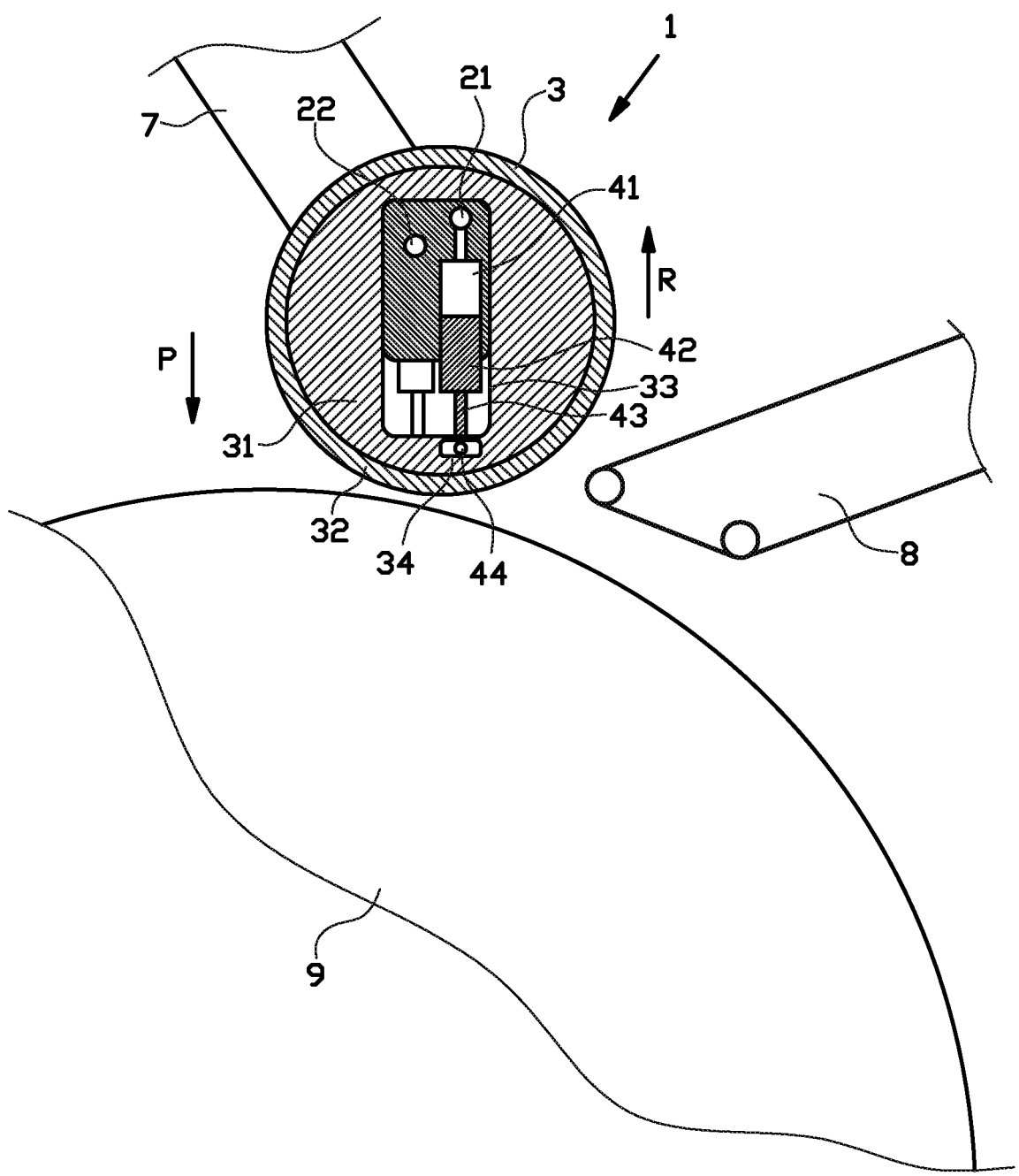
FIG. 2 shows a cross section of the pressure roll according to the line II-II in FIG. 1, together with a fixture for holding said pressure roll, a supply unit for supplying a tire layer and a tire building drum for receiving the tire layer from the supply unit.
Figure 3:
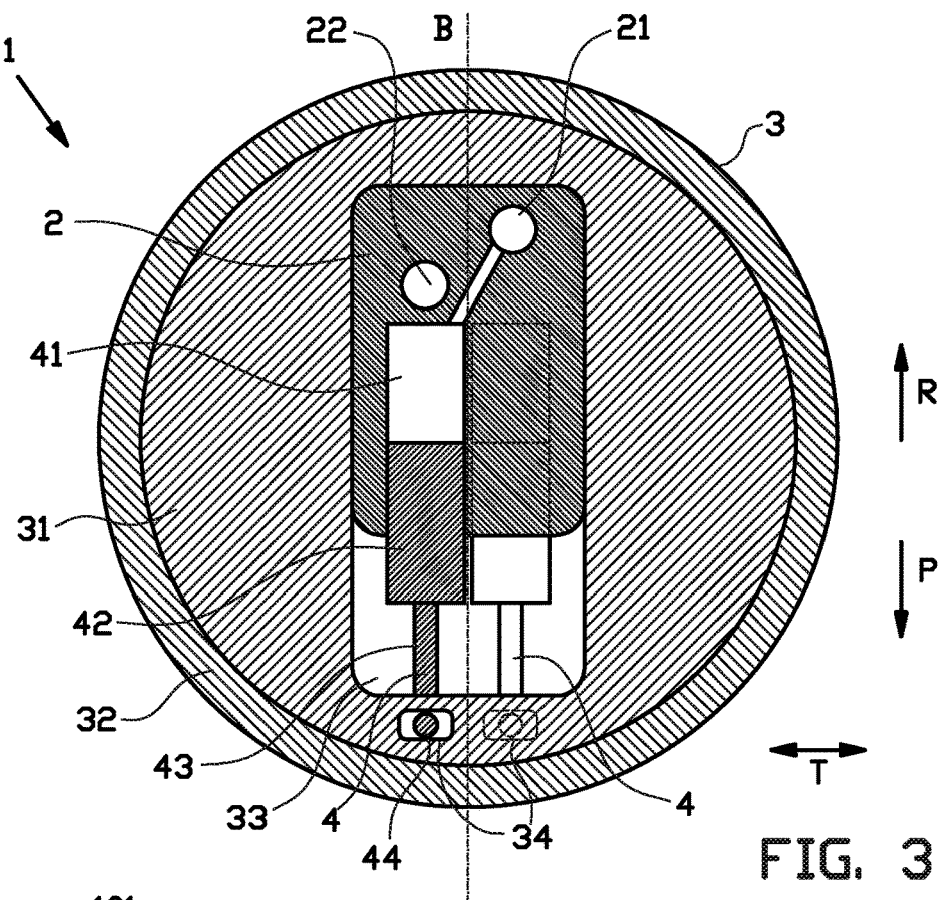
FIG. 3 shows a cross section of the pressure roll according to the line III-III in FIG. 1.

FIGS. 1-3 show a pressure roll 1 according to a first embodiment of the invention for pressing a tire layer (not shown) on a tire building drum 9 in a pressing direction P, as shown in FIG. 3. The pressure roll 1 is supported relative to tire building drum 9 by a holder 7. The tire layer may be supplied to the tire building drum 9 from a servicer, i.e. a conveyor 8.

The pressure roll 1 comprises a shaft 2 extending in an axial direction A. The shaft 2 defines a roll axis S of the pressure roll 1. As shown in FIG. 1, the shaft 2 has a substantially rectangular or quadrilateral cross section. The shaft 2 holds or comprises a plurality of air channels 21, 22 for air-controlled operation of the pressure roll 1. In the drawings, only two air channels 21, have been shown. In practice, the shaft 2 may be provided with more air channels, e.g. more than ten or more than twenty, to improve the flexibility of the control of the pressure roll 1. The pressure roll 1 further comprises a plurality of discs 3 arranged side-by-side or juxtaposed in the axial direction A on said shaft 2. As best seen in FIG. 1, each disc 3 comprises an interior part 31 that is supported on said shaft 2 and an exterior part 32 that extends around the interior part 31.

The interior part 31 is preferably non-rotatably supported on the shaft 2. The interior part 31 has a circular contour. In this exemplary embodiment, the interior part 31 is provided with a recess 33 for receiving the shaft 2 in the axial direction A through the respective disc 3. The recess 33 has a substantially rectangular or quadrilateral cross section that in a direction transverse to the pressing direction P has a width that substantially corresponds to the width of the shaft 2 in the same transverse direction. Hence, the shaft 2 can be received between the transverse sides of the recess 33 in a non-rotatable manner. In the pressing direction P, the recess 33 is larger than the shaft 2 so that the respective disc 3 may be moved in the pressing direction P and in a retraction direction R opposite to said pressing direction P. In particular, the respective disc 3 may slide over the transverse sides of the shaft 2 in the pressing direction P and the retraction direction R.

While the interior part 31 of the respective disc 3 is non-rotatably supported on the shaft 2 in the manner as described above, the exterior part 32 is rotatably arranged on the interior part 31 around or about the roll axis S. The exterior part 32 is formed as a ring that is placed concentrically about the circular interior part 31. The exterior part 32 is preferably rotatably connected to the interior part 31 via a plurality of bearings, preferably ball-bearings, known per se. Because of the movability of the discs 3 in the pressing direction P and the retraction direction R relative to the shaft 2, it will be clear that the roll axis S is not always exactly at the center of the aforementioned rotation. However, in each position of the discs 3, the roll axis S is located within the central area defined by the interior part 31, as a result of which the rotation of the exterior parts 32 can be considered as a rotation about the roll axis S in said central area.

As best seen in FIG. 1, the pressure roll 1 comprises a plurality of actuators 4, one for each disc 3. Each actuator 4 is arranged for individually moving the respective disc 3 with respect to the other discs 3. In this first embodiment of the invention, each actuator 4 is a bi-directional actuator 4 for alternately moving the respective disc 3 with respect to the shaft 2 in the pressing direction P and the retraction direction R. Later in this description, further embodiments will be introduced with separate actuators for moving the discs in the pressing direction P and the retraction direction R, respectively.

As shown in FIG. 1, the actuators 4 according to the first embodiment of the invention are formed as pneumatic or air cylinders. Each air cylinder comprises a chamber 41, a piston 42 that is arranged to be displaced through the chamber 41 under the influence of a pressure difference and a piston rod 43 that extends out of the chamber 41 to transfer the force onto the respective disc 3. As previously discussed, in this first embodiment of the invention, the actuators 4 are bi-directional. Consequently, the air cylinders are double-acting cylinders which are alternately driven by compressed air and a (partial) vacuum.

At the end of the piston rod 43, a coupling element 44 is provided for coupling or mechanically coupling the piston rod 43 to the interior part 31 of the respective disc 3. This allows the piston rod 43 to engage the interior part 31 of the respective disc 3 and to exert a pulling force onto said respective disc 3 in the retraction direction R. The coupling between the piston rod and the interior part 31 further ensures that the position of the respective disc 3 in the axial direction A is fixed or substantially fixed, i.e. that the actuator 4 does not move out of engagement with the interior part 31 of the respective disc 3 in the axial direction A. It will be apparent to one skilled in the art that instead of coupling the piston rod 43 to the interior part 31 of the respective disc 3, the piston rod 43 may also be connected to the interior part 31 of the respective disc 3 in a different way, e.g. magnetically, with screws, with bolts or more permanently by gluing or welding.

In this exemplary embodiment, the coupling element 44 is detachably coupled to the interior part 31 of the respective disc 3. This is particularly convenient during the assembly of the pressure roll 1 when each disc 3 is individually slid onto the shaft 3 in the axial direction A and coupled to a respective one of the actuators 4, and for disassembly. For this purpose, the interior part 31 of the respective disc 3 is provided with a mounting element 34 for mounting the coupling element 44. Preferably, the mounting element is a slot 34, wherein the coupling element is a twist-and-lock coupling element 44 that is arranged to engage the slot 34 by twisting. The twist-and-lock coupling element 44 can for example be a T-shaped end portion of the piston rod 43 that is arranged to hook into the slot 34.

As best seen in FIG. 3, the mounting elements 34 of two directly adjacent discs 3 are offset with respect to each other in an offset direction T transverse or perpendicular to the pressing direction P and the axial direction A. The mounting element 34 of the disc 3 at the rear of FIG. 3 is shown in dashed lines. The offset of the mounting elements 34 has the advantage that the actuators 4 may be offset in the same offset direction T to fit the actuators 4 more closely together in the shaft 2. The actuator 4 of the disc 3 at the rear of FIG. 3 is shown in dashed lines. Because of the offset of the actuators 4, the chambers 41 and pistons 42 of the actuators 4 may actually be wider than the width of the discs 3 in the axial direction A, as long as the offset actuators 4 fit alongside each other in the shaft 2. A wider chamber 41 and piston 42 can result in a greater force being applied to the piston 42.

Preferably, the mounting elements 44 of the two direction adjacent discs 3 are offset with respect to each other over the same distance from the center of the disc 3 in the offset direction T. In other words, when each disc 3 has a bisector line B that divides the circular shape of the interior part 31 into two equal halves, then the mounting elements 34 of the two directly adjacent discs 3 are located on opposite sides of and at the same distance from the bisector line B. This allows for the interior parts 31 of the two directly adjacent discs 3 to be identical or substantially identical. When assembling the pressure roll 1, one disc 3 is simply flipped about the bisector line B with respect to the other of the two directly adjacent discs 3 to obtain a mirrored configuration. Hence, only one type of disc 3 is required for the assembly.

Figure 11:
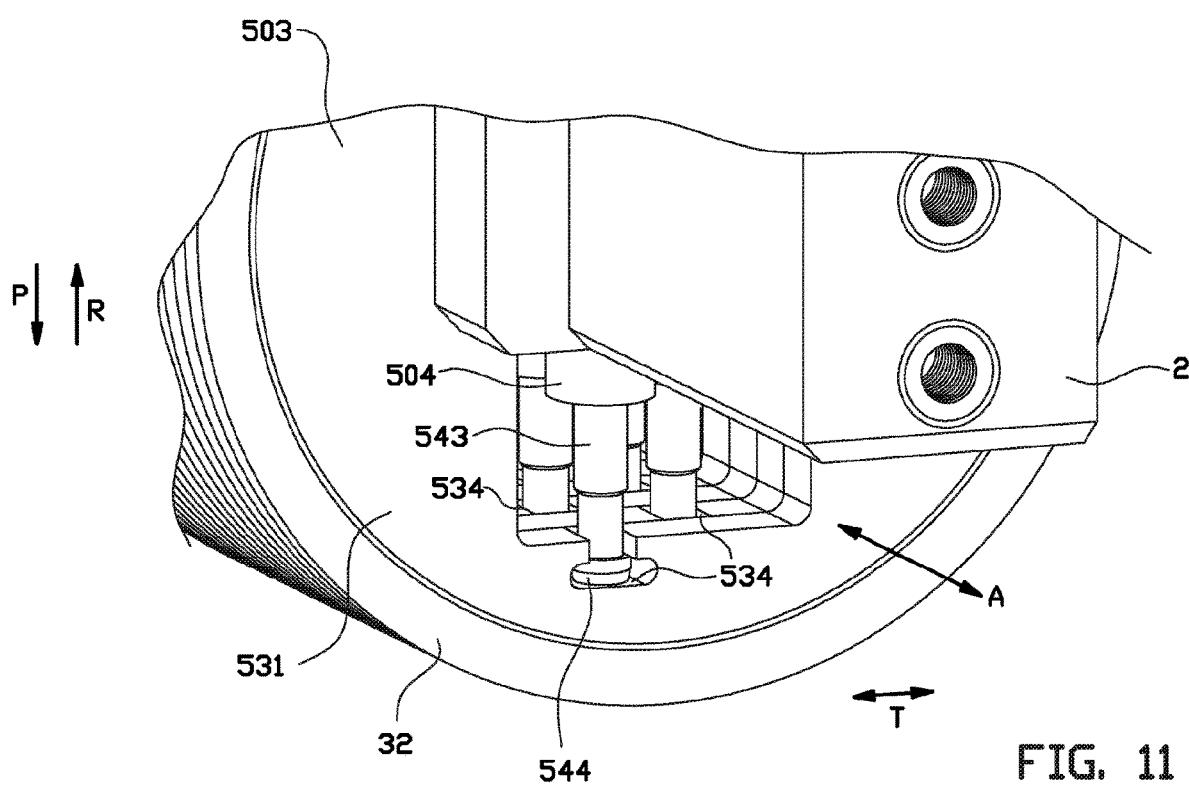
FIG. 11 shows a perspective view of an alternative coupling element for coupling the discs to the shaft.

FIG. 11 shows an alternative disc 503 with an alternative combination of a slot 534 and a coupling element 544. The slot 534 extends from side-to-side completely through the interior part 531 in the axial direction A so that the coupling element 544 at the end of the piston rod 543 may be received into the slot 534 in the axial direction A. Hence, during assembly, the alternative disc 503 may simply be slid onto the shaft 2 in the axial direction A. To restrict the sliding of the alternative disc 503 with respect to the coupling element 544, the positions of the slots 534 are again offset in the offset direction T in the same manner as the mounting elements 44 of FIG. 3. Because of the offset in the offset direction T, the interior parts 531 of the directly adjacent discs 3 block or close the slot 534 in the axial direction A to stop the coupling element 544 from sliding out of engagement with the interior part 531 of the respective disc 3 in the axial direction A.

As previously discussed, the shaft 2 comprises a plurality of air channels 21, 22, as shown in FIG. 1. In this first embodiment, the chambers 41 of the actuators 4 are connected in air communication with one of the air channels 21, 22 inside the shaft 2 to alternately receive compressed air or a (partial) vacuum. More in particular, the air channels 21, 22 are individually connectable to an external valve unit (not shown) for alternately connecting the chambers 41 of the actuators 4 to a compressed air source and a vacuum source.

As shown in FIG. 1, the pressure roll 1 comprises two or more zones Z1-Z5. In this example, five zones are shown. In practice, more zones, e.g. more than ten or more than twenty zones, may be provided. Each zone Z1-Z5 comprises two or more discs 3 of the plurality of discs 3. The pressure roll 1 is configured in such a way that the actuators 4 associated with the discs 3 within one of the zones Z1-Z5 move all the discs 3 within said one zone Z1-Z5 simultaneously in the pressing direction P or the retraction direction R. More in particular, the shaft 2 comprises an air channel 21, 22 for each zone Z1-Z5 and all actuators 4 from the discs 3 within one zone Z1-Z5 are connected in air communication to the same air channel 21, 22. By connecting several actuators 4 to the same air channel 21, 22, less air channels 21, 22 are required, thus allowing said air channels 21, 22 to be accommodated more easily within the cross section of the shaft 2.

Figure 8:
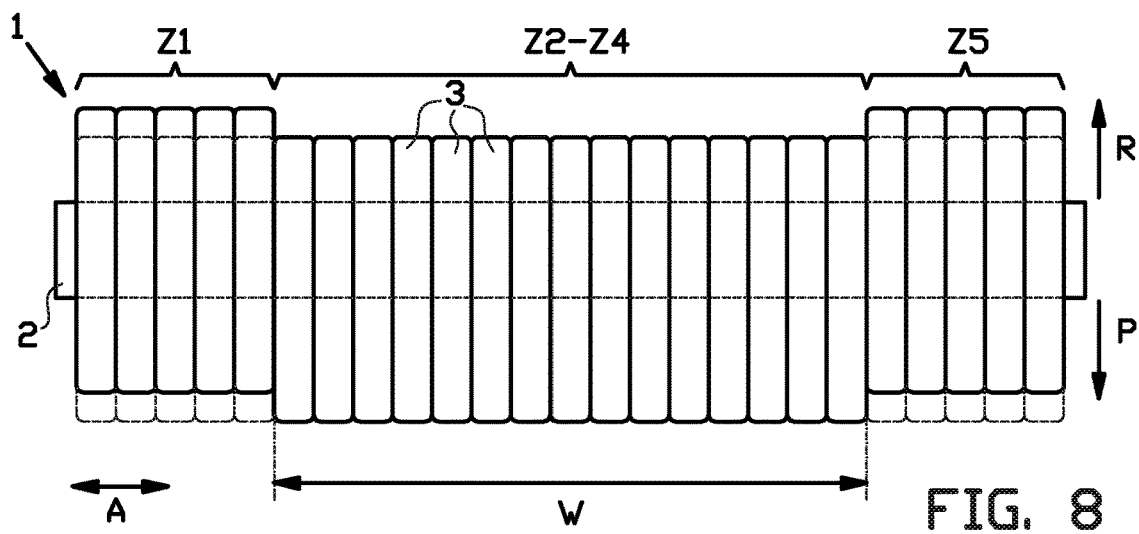
FIGS. 8, 9 and 10 show the pressure roll according to FIG. 1, wherein the plurality of discs are divided into a plurality of zones and wherein the discs are controlled according to said plurality of zones.
Figure 9:
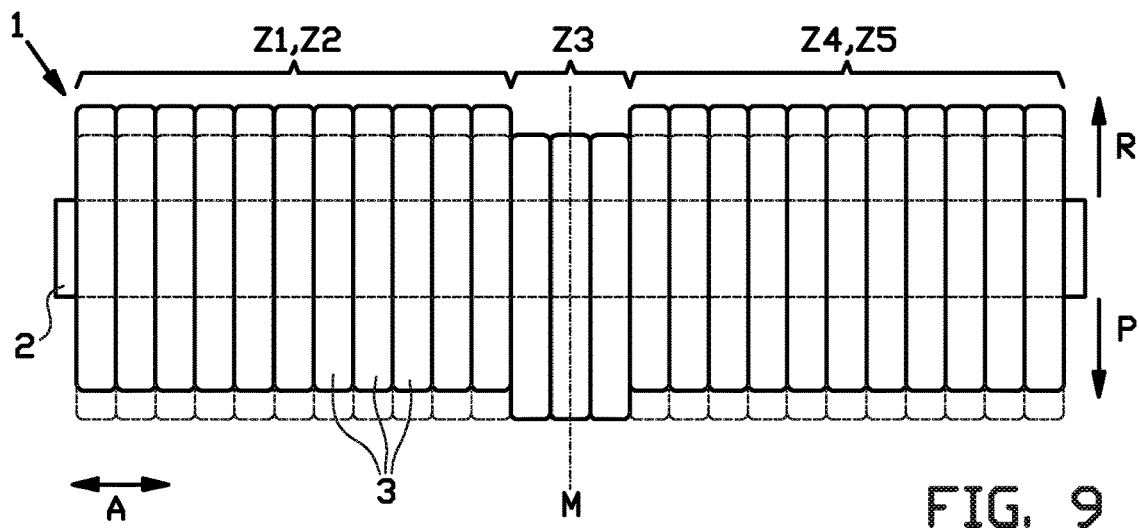
Figure 10:
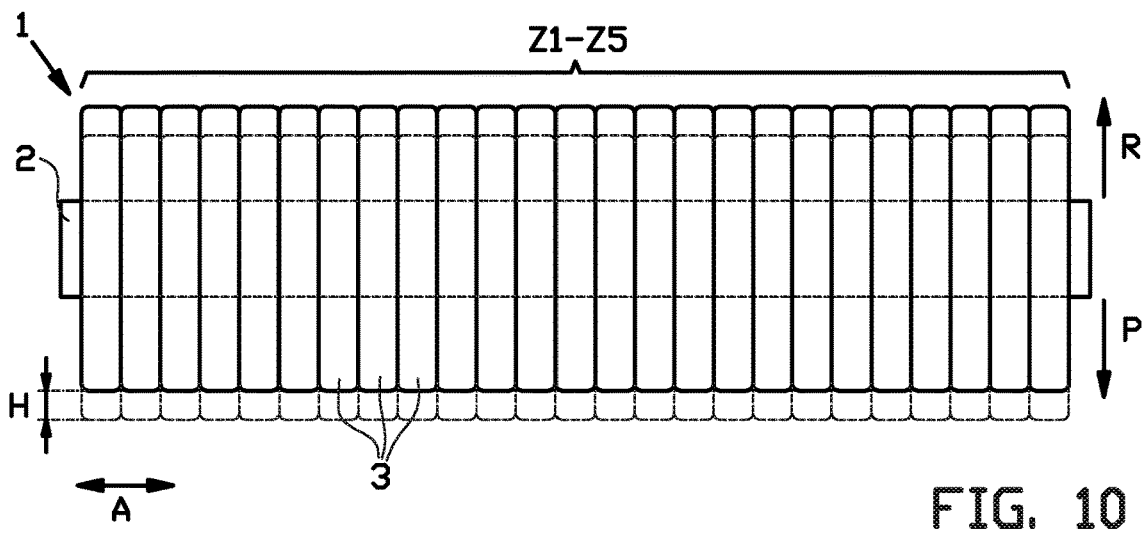

Controlling the pressure roll 1 in zones Z1-Z5 can be particularly useful in one or more of the situations as schematically shown in FIGS. 8, 9 and 10.

FIG. 8 shows the situation in which the width W of the tire building drum 9 is variable or the tire building drum 9 is replaceable by an alternative tire building drum (not shown) with a different width W. The pressure roll 1 according to the invention thus provides the opportunity of moving the discs 3 in one or more zones Z1, Z5 that are outside or at least partially outside the width W of the tire building drum 9 in the retraction direction R away from the tire building drum 9 while moving the discs 3 in one or more zones Z2-Z4 that are within the width W of the tire building drum 9 in the pressing direction P towards the tire building drum 9. Hence, the discs 3 in the zones Z1, Z5 outside of the width W can be actively moved away from the tire building drum 3 to prevent collisions and/or unnecessary wear.

FIG. 9 shows the situation in which the two or more zones Z1-Z5 comprise a center zone Z3 and side zones Z1-Z2, Z4-Z5 on either side of the center zone Z3 in the axial direction A. The discs 3 in the side zones Z1-Z2, Z4-Z5 can be moved in the retraction direction R while the discs 3 in the center zone Z3 are moved in the pressing direction P. In this way a tire layer that is smaller than the actual width W of the tire building drum 9 can be pressed more accurately, while preventing that discs 3 outside of the center zone Z3 wear unnecessarily on the surface of the tire building drum 9. The same center zone Z3 may alternatively be used to press only a center portion of a tire layer to impart a centering force on said tire layer.

FIG. 10 shows the situation in which all discs 3 of the plurality of discs 3 are simultaneously moved in the retraction direction R so that the plurality of discs 3 as a whole is lifted over a height distance H. This can be particularly useful when there is a need to lift the discs 3 from the surface of the tire building drum 9, e.g. for maintenance purposes or between cycles. In the conventional pressure roll, this would require lifting the pressure roll 1 as a whole, i.e. by lifting the shaft 2. In the present invention, the shaft 2 can actually remain stationary while the discs 3 are lifted, while the same effect is obtained. The simultaneous movement of all discs 3 in the retraction direction 3 can alternatively be used to temporarily lift the discs 3 when a leading end, a trailing end, a splice or another known or detected irregularity in the tire layer is about to pass or passes underneath said plurality of discs 3.

It will be apparent to one skilled in the art that when the shaft 2 is large enough to accommodate individual air channels for each individual disc 3, then there will be no zones Z1-Z5 and each disc 3 can be controlled individually. This may significantly improve the flexibility of the pressure roll 1, in particular in the situation as described above. For example, the positions of the discs 3 may be individually controlled to accurately follow the contour of a tire layer on the drum 9. However, considering that a typical pressure roll 1 would contain in the range of one-hundred to two-hundred discs 3, one would understand that both the configuration of the shaft 2 and the control of the pressure roll 1 would be considerably more complex as well. In practice, one will try to find a balance between the flexibility and the complexity of the pressure roll 1.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

Figure 4:
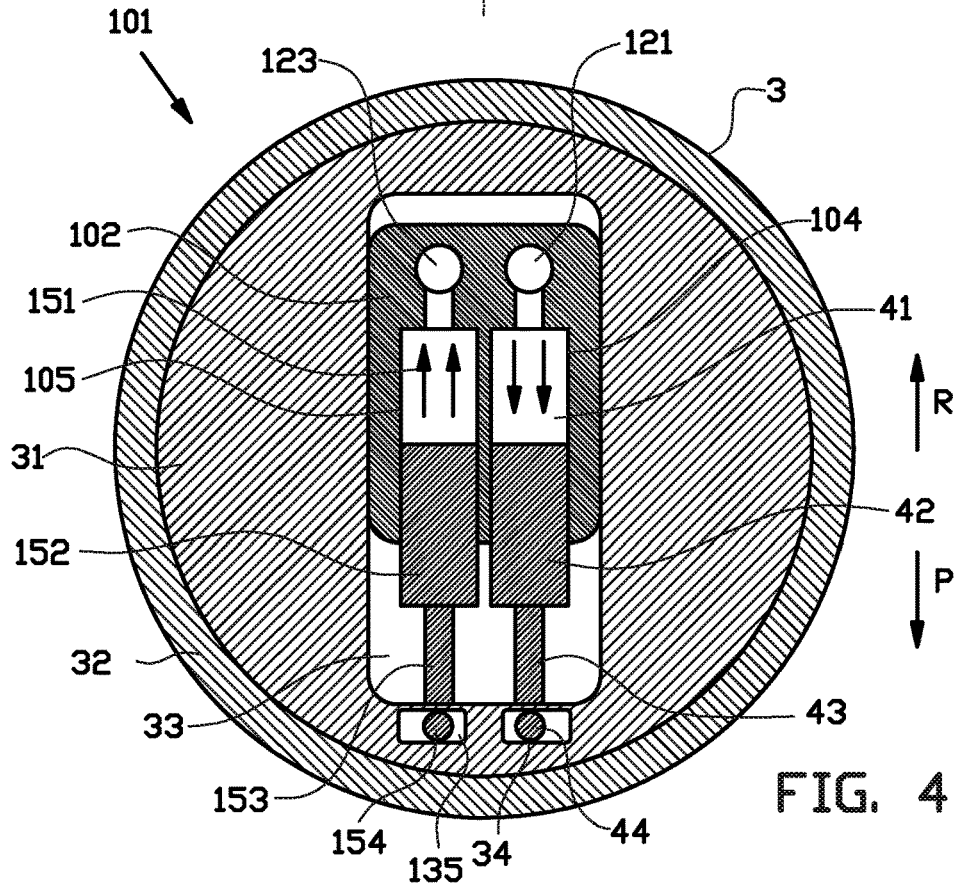
FIGS. 4, 5, 6 and 7 shows cross sections of alternative pressure rolls according to a second, third, fourth and fifth (unclaimed) exemplary embodiment of the invention, respectively.

For example, FIG. 4 shows an alternative pressure roll 101 according to a second embodiment of the invention. The alternative pressure roll 101 comprises, for each disc 3, a first actuator 104 for moving the respective disc 3 with respect to the shaft 102 in the pressing direction P and a second actuator 105 for moving the respective disc 3 with respect to the shaft 102 in the retraction direction R. More in particular, the first actuator 104 and the second actuator 105 are located in the recess 33 of the respective disc 3 on the same side of the shaft 102 in the pressing direction P. Consequently, the first actuator 104 is arranged for pushing the respective disc 3 away from the shaft 102 and wherein the second actuator 105 is arranged for pulling the respective disc 3 towards the shaft 102. It will be clear to one skilled in the art that the actuators 104, 105 may alternatively be arranged on the same side of the shaft 102 in the retraction direction R.

In this exemplary embodiment, the first actuator 104 and the second actuator 105 are pneumatic or air cylinders. The first actuator 104 is the same or substantially the same as the actuator 4 according the first embodiment of the invention. The second actuator 105, like the first actuator 104, has a chamber 151, a piston 152, a piston rod 153 and a coupling element 154. The interior part 31 of the disc 3 is provided with a secondary mounting element 135 in addition to the mounting element 34 of the first embodiment for mounting the coupling element 154 of the second actuator 105.

In contrast to the previously discussed first embodiment, the air cylinders of the second embodiment can be single-acting air cylinders. In particular, the first actuator 104 is an air cylinder connectable to a compressed air source and wherein the second actuator 105 is an air cylinder connectable to a vacuum source. For this purpose, the shaft 102 comprises a compressed air channel 121 for connecting the first actuator 104 to a compressed air source and a vacuum air channel 122 for connecting the second actuator 105 to a vacuum source.

Figure 5:
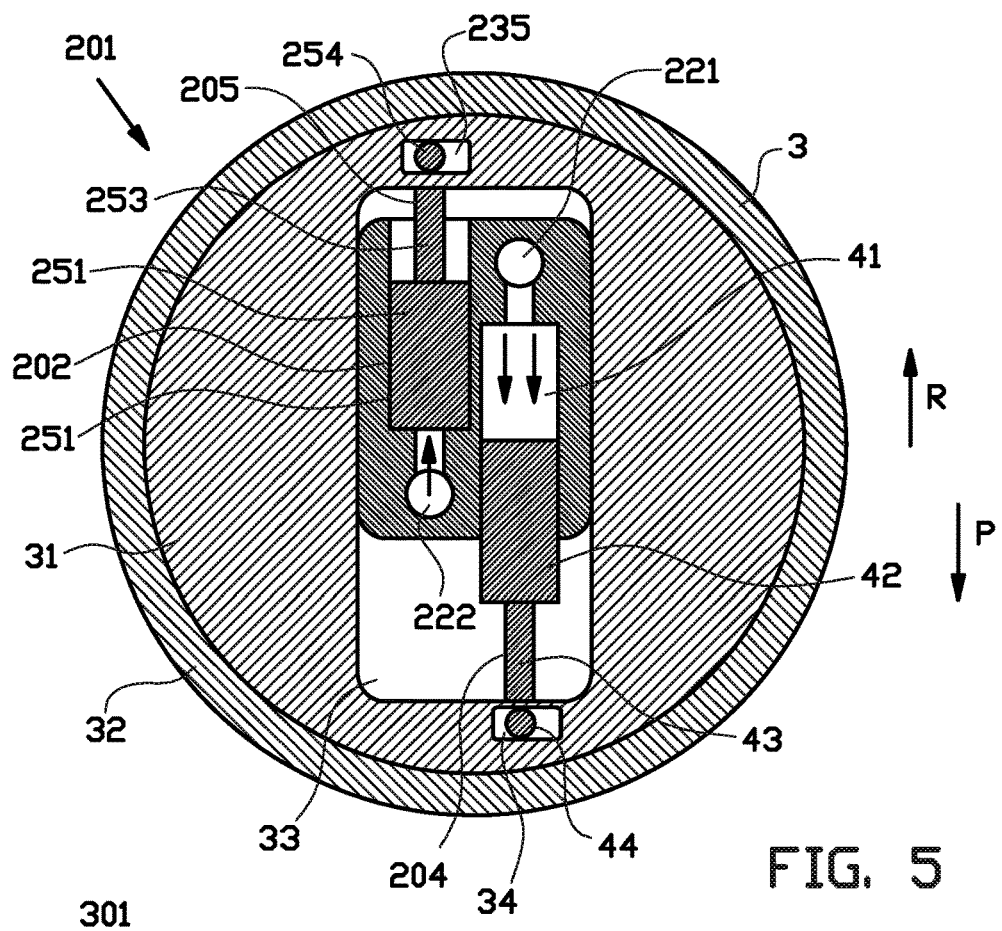

FIG. 5 shows a further alternative pressure roll 201 according to a third embodiment of the invention. This pressure roll 201 differs from the pressure roll 101 according to the second embodiment of the invention in that its first actuator 204 and its second actuator 205 are located in the recess 33 of the respective disc 3 on opposite sides of the shaft 202 in the pressing direction P and the retraction direction R, respectively. Consequently, the first actuator 204 and the second actuator 205 are both arranged for pushing the respective disc 3 away from the shaft 202 or pulling the respective disc 3 towards the shaft 202.

In this exemplary embodiment, The first actuator 204 and the second actuator 205 are pneumatic or air cylinders. The first actuator 204 is the same or substantially the same as the actuator 4 according the first embodiment of the invention. The second actuator 205, like the first actuator 204, has a chamber 251, a piston 252, a piston rod 253 and a coupling element 254. The interior part 31 of the disc 3 has a secondary mounting element 235 in addition to the mounting element 35 of the first embodiment for mounting the coupling element 254 of the second actuator 205 to the side of the recess 33 opposite to the first actuator 204.

As in the previous embodiment, the air cylinders can be single-acting cylinders which are both connectable to either a compressed air source or a vacuum source. In this embodiment, the pressure roll 201 is provided with a shaft 202 that comprises a first air channel 221 for connecting the first actuator 204 to a compressed air source or a vacuum source and a second air channel 222 for connecting the second actuator 205 to the same air source or vacuum source. A valve unit (not shown) may be provided at the channels 221, 222 or at the source for alternating between the air channels 221, 222 to cause a movement of the respective disc 3 in the pressing direction P or the retraction direction R.

Figure 6:
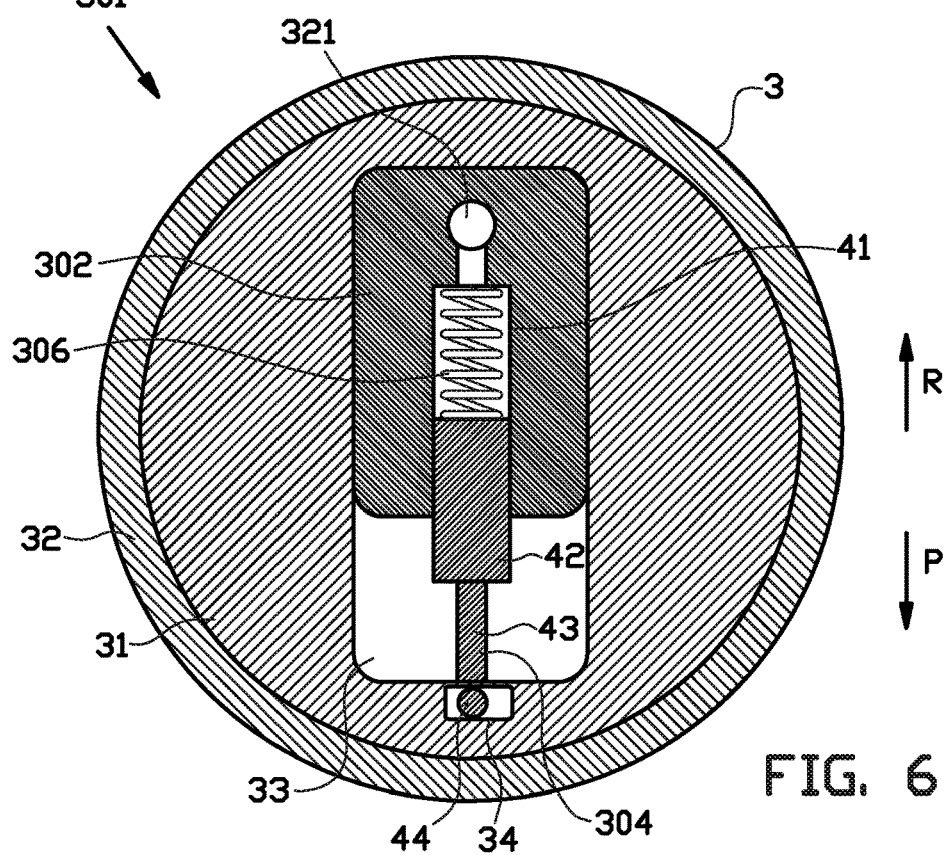

FIG. 6 shows a further alternative pressure roll 301 according to a fourth embodiment of the invention. This pressure roll 301 differs from the previously discussed pressure rolls 1, 101, 201 in that it features an auto return actuator 304. This auto-return actuator 304 is slightly different from the bi-directional actuator 4 of the first embodiment, because it is only actively driven in one direction. For this purpose, it is provided with a drive element, e.g. the chamber 41 and the piston 42 that together form the air cylinder, for driving the movement of the auto-return actuator 304 in the pressing direction P and a biasing element 306 for passively returning the auto-return actuator 304 in the retraction direction R. Alternatively, the biasing element 306 biases the auto-return actuator 304 in the pressing direction P and the drive element 41, 42 is arranged for driving the movement of the auto-return actuator 304 in the retraction direction R. The biasing element 306 may be a spring that is biased to contract or expand to its natural length, depending on the required biasing direction. When the auto-return actuator 304 is a single-acting pneumatic or air cylinder, the shaft 302 is provided with a single air channel 321 for connecting the chamber 41 of said air cylinder to a compressed air source or a vacuum source.

Figure 7:
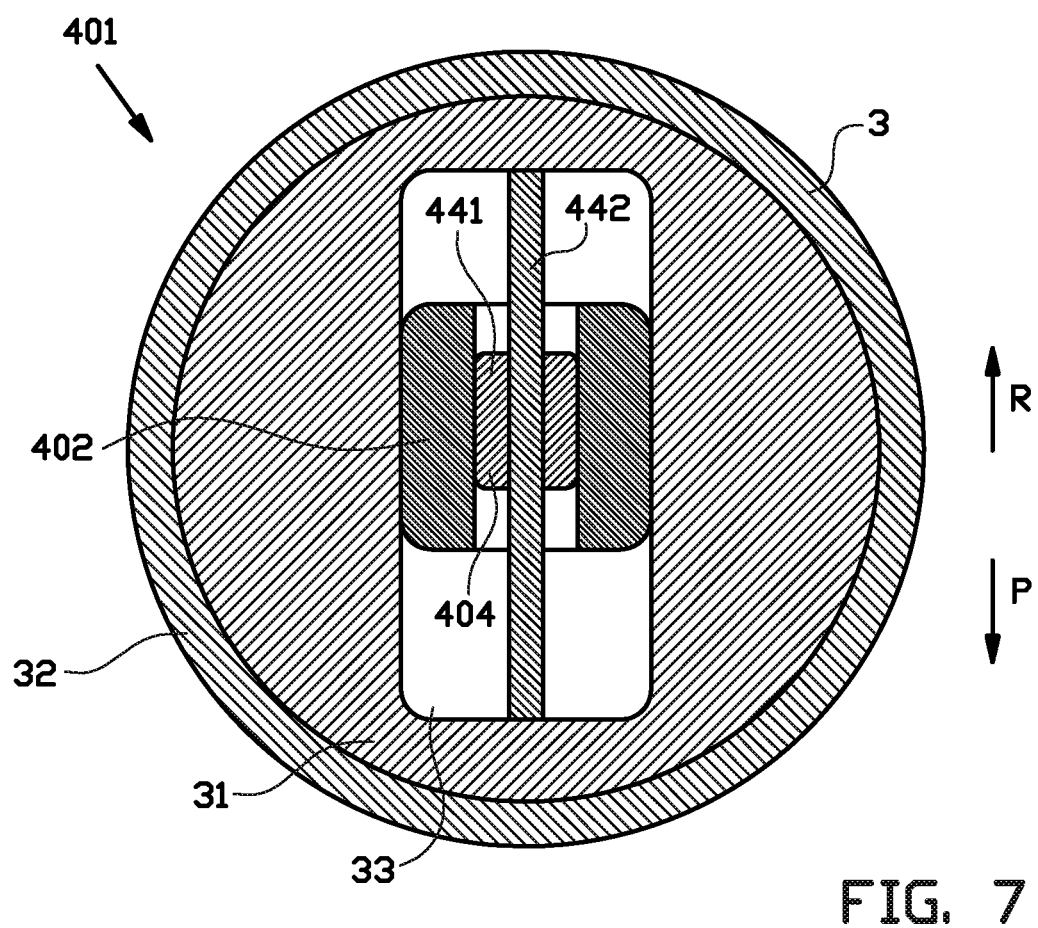

FIG. 7 shows a further alternative pressure roll 401 according to an unclaimed fifth embodiment of the invention. This pressure roll 401 differs from the previously discussed pressure rolls 1, 101, 201, 301 in that it features an electromechanical, bi-directional actuator 404. In particular, said actuator 404 comprises a linear drive 441, e.g. a spindle drive, that is arranged to engage with or run along a linear guide 442 that extends in the recess 33 in the pressing direction P. Said linear drive 441 may be electrically connected to and electrically driven by an electric power supply connected to said linear drive 441 through the shaft 402.

LIST OF REFERENCE NUMERALS 1 pressure roll
2 shaft
21 first air channel
22 second air channel
3 disc
31 interior part
32 exterior part
33 recess
34 mounting element
4 bi-directional actuator
41 chamber
42 piston
43 piston rod
44 coupling element
7 holder
8 conveyor
9 tire building drum
101 alternative pressure roll
102 shaft
121 compressed air channel
123 vacuum channel
104 first actuator
105 second actuator
151 chamber
152 piston
153 piston rod
154 coupling element
135 secondary mounting element
201 further alternative pressure roll
202 shaft
221 first air channel
222 second air channel
204 first actuator
205 second actuator
251 chamber
252 piston
253 piston rod
254 coupling element
235 secondary mounting element
301 further alternative pressure roll
302 shaft
321 single air channel
304 auto-return actuator
341 drive element
306 biasing element
401 further alternative pressure roll
402 shaft
404 electromechanical actuator
441 linear drive
442 linear guide
503 alternative disc
531 interior part
534 mounting element
504 actuator
543 piston rod
544 coupling element
A axial direction
B bisector line H height distance
P pressing direction
R retraction direction
S roll axis
T offset direction
W tire building drum width
Z1-Z5 zones

The invention claimed is:

1. A pressure roll for pressing a tire layer on a tire building drum in a pressing direction, wherein the pressure roll comprises a shaft that defines a roll axis extending in an axial direction and a plurality of discs juxtaposed in the axial direction on said shaft, wherein each disc comprises an interior part that is non-rotatably supported on the shaft and an exterior part that is rotatable with respect to the interior part about the roll axis, wherein each interior part extends from side surface to side surface of the respective disc in the axial direction, wherein each interior part is provided with a recess for receiving the shaft in the axial direction through the respective disc, wherein the recess is larger than the shaft in the pressing direction for allowing movement of the respective disc with respect to said shaft in the pressing direction, wherein the pressure roll comprises for each disc one or more actuators for individually moving the respective disc with respect to the other discs, wherein one of the one or more actuators is arranged for moving the respective disc with respect to the shaft in the pressing direction and wherein the same or another one of the one or more actuators is arranged for moving the respective disc with respect to the shaft in a retraction direction opposite to the pressing direction, wherein at least one of the one or more actuators is provided with a coupling element for coupling said at least one actuator to the interior part of the respective disc in the pressing direction, wherein the interior part of the respective disc is provided with a mounting element for mounting the coupling element, wherein the mounting element is a slot extending from side to side completely through the interior part in the axial direction, wherein the coupling element is arranged to engage the slot for detachably coupling said at least one actuator to the interior part of the respective disc in the pressing direction.

2. The pressure roll according to claim 1, wherein the one or more actuators comprise a bi-directional actuator for alternately moving the respective disc with respect to the shaft in the pressing direction and the retraction direction.

3. The pressure roll according to claim 2, wherein the bi-directional actuator is an air cylinder that is connectable to a valve unit for alternately connecting to a compressed air source and a vacuum source.

4. The pressure roll according to claim 2, wherein the shaft comprises an air channel for connecting the respective bi-directional actuator to a valve unit for alternately connecting to a compressed air source and a vacuum source.

5. The pressure roll according to claim 1, wherein the one or more actuators comprise a first actuator for moving the respective disc with respect to the shaft in the pressing direction and a second actuator for moving the respective disc with respect to the shaft in the retraction direction.

6. The pressure roll according to claim 5, wherein the first actuator and the second actuator are located in the recess of the respective disc on the same side of the shaft in the pressing direction or the retraction direction, wherein the first actuator is arranged for pushing the respective disc away from the shaft and wherein the second actuator is arranged for pulling the respective disc towards the shaft.

7. The pressure roll according to claim 6, wherein the first actuator is an air cylinder connectable to a compressed air source and wherein the second actuator is an air cylinder connectable to a vacuum source.

8. The pressure roll according to claim 7, wherein the shaft comprises a compressed air channel for connecting the first actuator to a compressed air source and a vacuum air channel for connecting the second actuator to a vacuum source.

9. The pressure roll according to claim 5, wherein the first actuator and the second actuator are located in the recess of the respective disc on opposite sides of the shaft in the pressing direction and the retraction direction, respectively, wherein the first actuator and the second actuator are both arranged for pushing the respective disc away from the shaft or pulling the respective disc towards the shaft.

10. The pressure roll according to claim 9, wherein the first actuator and the second actuator are air cylinders which are connectable to a compressed air source or a vacuum source.

11. The pressure roll according to claim 10, wherein the shaft comprises a first air channel for connecting the first actuator to a compressed air source or a vacuum source and a second air channel for connecting the second actuator to the same compressed air source or vacuum source.

12. The pressure roll according to claim 1, wherein the one or more actuators comprise an auto return actuator that is provided with a drive element that is arranged for driving the movement of the respective disc in one of the pressing direction and the retraction direction and a biasing element that is arranged to bias the drive element to return in the other of the pressing direction and the retraction direction.

13. The pressure roll according to claim 2, wherein the bi-directional actuator is a mechanical, electric or electro-mechanical bi-directional actuator.

14. The pressure roll according to claim 1, wherein directly adjacent discs block or close the slot in the axial direction to stop the coupling element from sliding out of engagement with the interior part of the respective disc in the axial direction.

15. The pressure roll according to claim 1, wherein the mounting elements of directly adjacent discs are offset with respect to each other in an offset direction perpendicular to the pressing direction and the axial direction.

16. The pressure roll according to claim 15, wherein each disc has a bisector line extending parallel to the pressing direction, wherein the mounting elements of the directly adjacent discs are located on opposite sides of and at the same distance from the bisector line.

17. The pressure roll according to claim 16, wherein the directly adjacent discs are identical, wherein one of the discs of the directly adjacent discs is flipped about the bisector line with respect to the other of the directly adjacent discs.

18. The pressure roll according to claim 1, wherein the pressure roll comprises two or more zones, wherein each zone comprises two or more discs of the plurality of discs, wherein the actuators for moving the discs within one of the zones are arranged to move all the discs within said one zone simultaneously in the pressing direction or the retraction direction.

19. A method for pressing a tire layer on a tire building drum in a pressing direction, wherein the method comprises the steps of:

providing pressure roll which comprises a shaft that defines a roll axis extending in an axial direction and a plurality of discs juxtaposed in the axial direction on said shaft, wherein each disc comprises an interior part that is non-rotatably supported on the shaft and an exterior part that is rotatable with respect to the interior part about the roll axis, wherein each interior part extends from side surface to side surface of the respective disc in the axial direction, wherein each interior part is provided with a recess for receiving the shaft in the axial direction through the respective disc, wherein the recess is larger than the shaft in the pressing direction for allowing movement of the respective disc with respect to said shaft in the pressing direction, wherein the pressure roll comprises for each disc one or more actuators for individually moving the respective disc with respect to the other discs, wherein one of the one or more actuators is arranged for moving the respective disc with respect to the shaft in the pressing direction and wherein the same or another one of the one or more actuators is arranged for moving the respective disc with respect to the shaft in a retraction direction opposite to the pressing direction, wherein at least one of the one or more actuators is provided with a coupling element for coupling said at least one actuator to the interior part of the respective disc in the pressing direction, wherein the interior part of the respective disc is provided with a mounting element for mounting the coupling element, wherein the mounting element is a slot extending from side to side completely through the interior part in the axial direction;

assembling pressure roll by sliding the respective disc onto the shaft in the axial direction such that the coupling element engages the slot for detachably coupling said at least one actuator to the interior part of the respective disc in the pressing direction;

using one of the one or more actuators for moving the respective disc with respect to the shaft in the pressing direction; and using the same or another one of the one or more actuators for moving the respective disc with respect to the shaft in the retraction direction.

20. The method according to claim 19, wherein the one or more actuators comprise a bi-directional actuator that alternately moves the respective disc with respect to the shaft in the pressing direction and the retraction direction.

21. The method according to claim 19, wherein the one or more actuators comprise a first actuator and a second actuator, wherein the first actuator moves the respective disc with respect to the shaft in the pressing direction and wherein the second actuator moves the respective disc with respect to the shaft in the retraction direction.

22. The method according to claim 19, wherein the one or ore actuators comprise an auto return actuator that comprises a drive element and a biasing element wherein the method comprises the step of driving the drive element to move the respective disc in one of the pressing direction and the retraction direction and allowing the biasing element to return the disc in the other of the pressing direction and the retraction direction when the drive element is no longer driven.

23. The method according to claim 19, wherein the pressure roll comprises two or more zones, wherein each zone comprises two or more discs of the plurality of discs, wherein the actuators for moving the discs within one of the zones move all the discs within said one zone simultaneously in the pressing direction or the retraction direction.

24. The method according to claim 23, wherein the width of the tire building drum is variable or the tire building drum is replaceable by an alternative tire building drum with a different width, wherein the method comprises the step of moving the discs in one or more zones that are outside or at least partially outside the width of the tire building drum in the retraction direction away from the tire building drum while moving the discs in one or more zones that are within the width of the tire building drum in the pressing direction towards the tire building drum.

25. The method according to claim 23, wherein the two or more zones comprise a center zone and side zones on either side of the center zone in the axial direction, wherein the method comprises the step of moving the discs in the side zones in the retraction direction while moving the discs in the center zone in the pressing direction.

26. The method according to claim 19, herein the method comprises the step of simultaneously moving all discs of the plurality of discs in the retraction direction.

27. The method according to claim 26, wherein the shaft remains stationary with respect to the tire building drum during the simultaneous movement of all discs of the plurality of discs in the retraction direction.

28. The method according to claim 26, wherein all discs of the plurality of discs are simultaneously moved in the retraction direction when a leading end, a trailing end, a splice or another known or detected irregularity in the tire layer passes underneath said plurality of discs.

29. The method according to claim 19, wherein the mounting elements of directly adjacent discs are offset with respect to each other in an offset direction perpendicular to the pressing direction and the axial direction.

30. The method according to claim 29, wherein each disc has a bisector line extending parallel to the pressing direction, wherein the mounting elements of the directly adjacent discs are located on opposite sides of and at the same distance from the bisector line.

31. The method according to claim 30, wherein the directly adjacent discs are identical, wherein the method comprises the step of flipping one of the discs of the directly adjacent discs about the bisector line with respect to the other of the directly adjacent discs.

32. The method according to claim 19, wherein the slot has a T-shaped cross section in a cross section perpendicular to the roll axis, the T-shaped cross section having stem that is connected to the recess.

* * * * *